United States Patent
Boys et al.

(10) Patent No.: US 10,673,279 B2
(45) Date of Patent: Jun. 2, 2020

(54) INDUCTIVE POWER TRANSFER APPARATUS

(71) Applicant: AUCKLAND UNISERVICES LIMITED, Auckland (NZ)

(72) Inventors: John Talbot Boys, Takapuna (NZ); Grant Anthony Covic, Mount Albert (NZ)

(73) Assignee: Auckland UniServices Limited, Grafton (NZ)

( * ) Notice: Subject to any disclaimer, the term of this patent is extended or adjusted under 35 U.S.C. 154(b) by 404 days.

(21) Appl. No.: 15/324,699

(22) PCT Filed: Jul. 8, 2015

(86) PCT No.: PCT/NZ2015/050087
§ 371 (c)(1),
(2) Date: Jan. 7, 2017

(87) PCT Pub. No.: WO2016/007023
PCT Pub. Date: Jan. 14, 2016

(65) Prior Publication Data
US 2017/0214276 A1 Jul. 27, 2017

(30) Foreign Application Priority Data

Jul. 8, 2014 (NZ) .................................... 627210
Mar. 17, 2015 (NZ) .................................... 706024
Apr. 1, 2015 (NZ) .................................... 706620

(51) Int. Cl.
*H02J 50/12* (2016.01)
*H01F 38/14* (2006.01)
(Continued)

(52) U.S. Cl.
CPC .............. *H02J 50/12* (2016.02); *B60L 53/12* (2019.02); *H01F 27/24* (2013.01); *H01F 27/28* (2013.01);
(Continued)

(58) Field of Classification Search
CPC ........................................................ H02J 50/12
See application file for complete search history.

(56) References Cited

U.S. PATENT DOCUMENTS 4,836,344 A 6/1989 Bolger
5,293,308 A 3/1994 Boys et al.
(Continued)

FOREIGN PATENT DOCUMENTS

JP 2011050127 A * 3/2011 ............. H02J 7/025
WO WO-2008140333 11/2008
(Continued)

OTHER PUBLICATIONS

Wikipedia contributors. "Magnetonnotive force." Wikipedia, The Free Encyclopedia. Wikipedia, The Free Encyclopedia, May 16, 2019. Web. Aug. 21, 2019. (Year: 2019).*
(Continued)

*Primary Examiner* — Daniel J Cavallari
(74) *Attorney, Agent, or Firm* — SChwegman Lundberg & Woessner, P.A.

(57) ABSTRACT

An inductive power transfer apparatus may be used for producing or receiving a magnetic field for inductive power transfer. The apparatus has a central coil and two end coils, one of the end coils being provided at each end of the central coil. Some turns of each of the end coils are on one side of the central coil and the remaining turns are on the other side. The end coils act to weaken or cancel flux on one side of the central coil and guide magnetic flux through the central coil (Continued)

to provide an arch shaped flux pattern beyond the apparatus on the other side of the central coil.

9 Claims, 9 Drawing Sheets

(51) Int. Cl.
| | | |
|---|---|---|
| *H01F 27/38* | (2006.01) | |
| *H02J 50/10* | (2016.01) | |
| *B60L 53/12* | (2019.01) | |
| *H01F 27/24* | (2006.01) | |
| *H01F 27/28* | (2006.01) | |

(52) U.S. Cl.
CPC .............. *H01F 27/38* (2013.01); *H01F 38/14* (2013.01); *H02J 50/10* (2016.02)

(56) References Cited

U.S. PATENT DOCUMENTS

| | | | | |
|---|---|---|---|---|
| 5,606,237 | A * | 2/1997 | Biasotti | B60L 11/182 320/108 |
| 2008/0116847 | A1 | 5/2008 | Loke et al. | |
| 2011/0089768 | A1 | 4/2011 | Byrne et al. | |
| 2015/0001955 | A1 * | 1/2015 | Yamada | H02J 50/12 307/104 |
| 2015/0332847 | A1 * | 11/2015 | Omori | H01F 38/14 307/104 |

FOREIGN PATENT DOCUMENTS

| | | |
|---|---|---|
| WO | WO-2009027674 A1 | 3/2009 |
| WO | WO-2010090539 A1 | 8/2010 |
| WO | WO-2011016737 A1 | 2/2011 |
| WO | WO-2013062427 | 5/2013 |
| WO | WO-2016007023 | 1/2016 |

OTHER PUBLICATIONS

"International Application No. PCT/NZ2015/050087, International Search Report and Written Opinion dated Oct. 20, 2015", (Oct. 20, 2015), 9 pgs.

"International Application No. PCT/NZ2015/050087, International Preliminary Report on Patentability dated Jan. 19, 2017", (Jan. 19, 2017), 6 pgs.

* cited by examiner

INDUCTIVE POWER TRANSFER APPARATUS

PRIORITY CLAIM TO RELATED APPLICATIONS

This application is a U.S. national stage application filed under 35 U.S.C. § 371 from International Application Serial No. PCT/NZ2015/050087, which was filed 8 Jul. 2015, and published as WO2016/007023 on 14 Jan. 2016, and which claims priority to New Zealand Application No. 627210, filed 8 Jul. 2014, and which claims priority to New Zealand Application No. 706024, filed 17 Mar. 2015, and which claims priority to New Zealand Application No. 706620, filed 1 Apr. 2015, which applications and publication are incorporated by reference as if reproduced herein and made a part hereof in their entirety, and the benefit of priority of each of which is claimed herein.

FIELD OF INVENTION

The present invention relates to apparatus for producing magnetic flux from a source of electrical energy and/or receiving magnetic flux to provide a source of electrical energy. In one application the invention couples magnetic flux to provide an inductive power transfer device or structure which may also be used as a magnetic flux generator or receiver for use in inductive power transfer (IPT), i.e. wireless power transfer, applications.

BACKGROUND OF INVENTION

Wireless power transfer systems are loosely coupled magnetic systems which require an adequate field strength to be provided at a required distance from the power "transmission" structure to the power "receiving" structure. One example is charging electric vehicles. Power may be transmitted from a magnetic flux coupling device provided in or on a ground surface to a vehicle in the vicinity of the device. The ground device must have mechanical robustness coupled with the ability to 'throw' magnetic flux in a high arching pattern so that a large part of that flux can be collected by another (possibly similar) flux coupling device on the vehicle. This is not a trivial task made more difficult by the stringent conditions pertaining to electric vehicles. The apparatus may also need to be capable of allowing power transfer in the reverse direction, for example with bi-directional systems.

Flux coupling devices are referred to in this document as "pads" for convenience, although they may take other forms.

One known form of pad for electric vehicle (EV) charging applications is generally circular in shape, and is described in International patent publication WO2008/140333. An attractive feature of these pads is that they have low emissions. However, the useful flux that they can provide is relatively small, and the height, i.e. distance that they can provide flux beyond the pad, is likewise small. A generally circular pad as described in the publication referred to above which has a diameter D can achieve a useful flux height of perhaps D/4. Thus for an EV with a 200 mm air-gap a pad of 800 mm diameter is needed.

Alternatively, a magnetically polarised pad structure which has two coils or windings may be used. This general structure is described in International patent publications WO2010/090539 and WO2011/016737. Pads that incorporate this structure are referred to herein for convenience as a "DD" pad (with variants "DDQ", and "Bipolar"). The DD type pad can throw flux much further—ideally twice as far as the circular pad. It is a polarized pad where a choice has to be made between laying the pad longitudinally along the direction of travel (XX), or transversely across the direction of travel (YY). The pads in the ground must have the same orientation as the pad under the EV or power transfer is not possible. The DD pad has two identical windings that touch (or almost touch) each other in the centre of the pad. These windings may be flat Archimedean spirals and they may sit on a bed of ferrite or striated ferrite strips. Characteristically the field is only out one side of the pad as the ferrite acts to concentrate flux behind the windings in the region between the pole areas so that there is no flux out the back of the bad. This is a highly desirable feature especially for the on-vehicle pad as it means that there is no flux in the cabin for the on-vehicle pad.

The flux pattern of the DD pad is characterised two flux areas. In the centre of the pad the flux paths are high and convex upwards and are ideal for linking to another DD pad. At each end of the pad the flux cannot link to another pad as it is turning away from any suitable pad. So these end fluxes produce no useful output. This wasted flux adds to the pad's inductance, reduce its coupling factor, and cause losses in any metal pieces it comes in contact with under the car. A high fraction of the total flux produced is in this category so if it could be reduced the pad would be improved.

Another pad structure comprises a simple solenoidal coil which is wound on a bar of ferrite. The pad produces flux out both sides and commonly one of these is removed using an aluminium screen. This removal is not very satisfactory and the pads have residual end flux that is very difficult to eliminate. For this reason these pads are invariably used in the direction of travel (XX) so that the distance to the edge of the car is greater and there is a longer section to remove the unwanted flux as cars are typically longer than they are wide. The solenoid pad can produce high useful flux patterns but they are less efficient as there are significant losses in the aluminium screens. However they do not have a high leakage and this is a beneficial feature.

The discussion above, and any references to prior art in this document, are not to be taken as an admission that the prior art referred to is publicly available in any country, nor that the prior art referred to is common general knowledge.

OBJECTS OF THE INVENTION

It is an object of the present invention to provide an inductive power transfer apparatus which may be able to overcome or at least ameliorate the above problems or at least will provide the public with a useful choice.

It is an alternative object of the invention to provide an inductive power transfer apparatus which will allow high flux usage and provide a low flux path length Further objects of the invention will become apparent from the following description.

BRIEF SUMMARY OF THE INVENTION

Accordingly in one aspect there is provided an inductive power transfer apparatus suitable for producing or receiving a magnetic field for inductive power transfer, the apparatus comprising:
  a central coil,
  two end coils, one end coil being provided at or adjacent to each end of the central coil, and
  wherein the coils are adapted to provide substantially the same MMF.

In another aspect of the present invention there is provided an inductive power transfer apparatus suitable for producing or receiving a magnetic field for inductive power transfer, the apparatus comprising:
- a central coil having first and second ends,
- two end coils,
- one end coil being provided at or adjacent to each end of the central coil,
- the coils being operable to provide substantially the same MMF, so that when energised the end coils guide magnetic flux through the central coil to provide an arch shaped flux pattern beyond the apparatus for inductive power transfer.

Preferably the coils are arranged such that when energised with a power source magnetic fields produced by each coil substantially augment each other on a first side of the apparatus and substantially weaken each other on a second (opposite) side of the apparatus.

In one embodiment each of the end coils is split or tapped or otherwise arranged to provide a first winding and a second winding.

Preferably the first windings are provided on one side of an axis of the central coil, and the second windings are provided on the other side of the axis of the central coil.

In one embodiment the apparatus may include a magnetically permeable member or structure.

In one embodiment the central coil produces or receives magnetic flux or a component thereof in the direction of the axis, and a further coil is provided to produce or receive flux in a direction orthogonal to the axis.

In another aspect there is provided an inductive power transfer apparatus suitable for producing or receiving a magnetic field for inductive power transfer, the apparatus comprising:
- a central coil having first and second ends and an axis therebetween,
- two end coils,
- one end coil being provided at or adjacent to each end of the central coil, and one or more turns of each of the end coils being on one side of the axis of the central coil and the remaining turns being on the other side of the axis,
- the end coils being operable when energised to weaken or cancel flux on one side of the axis and guide magnetic flux through the central coil to provide an arch shaped flux pattern beyond the apparatus on the other side of the axis for inductive power transfer.

In one embodiment the central coil produces or receives magnetic flux in the direction of the axis, and a further coil is provided to produce or receive flux in a direction orthogonal to the axis.

In one embodiment a magnetically permeable member is provided. The member may comprise a permeable material in or distributed through the apparatus.

In an embodiment the magnetically permeable member comprises a first second and third portion, wherein the second and third portions are perpendicular to the first portion.

In an embodiment at least one of the three or more coils is associated with each of the three portions of the magnetically permeable member.

In an embodiment the magnetically permeable member is a ferrite member.

In one embodiment the central coil has an axis and produces or receives magnetic flux in the direction of the axis, and a further coil is provided to produce or receive flux in a direction orthogonal to the axis.

In another aspect there is provided an inductive power transfer apparatus suitable for producing or receiving a magnetic field for inductive power transfer, the apparatus comprising:
- a magnetically permeable member,
- a central coil having first and second ends,
- two end coils,
- one end coil being provided at or adjacent to each end of the central coil,
- wherein the coils are magnetically associated with the permeable member, and one or more turns of each end coil is provided on one side of the magnetically permeable member and the remaining turns of the end coils are provided on the other side of the magnetically permeable member.

Preferably the end coils are operable to guide magnetic flux through the central coil to provide an arch shaped flux pattern beyond the apparatus for inductive power transfer on one side of the magnetically permeable member.

In one embodiment the central coil has an axis and produces or receives magnetic flux in the direction of the axis, and a further coil is provided to produce or receive flux in a direction orthogonal to the axis.

In another aspect there is provided an inductive power transfer apparatus suitable for producing or receiving a magnetic field for inductive power transfer, the apparatus comprising:
- a central coil having first and second ends and an axis therebetween,
- two end coils,
- both end coils being provided at or adjacent to one end of the central coil, and one of the end coils being on one side of the axis of the central coil and the other end coil being on the other side of the axis,
- the end coils being operable when energised to guide magnetic flux through the central coil to provide a required flux pattern beyond the apparatus for inductive power transfer.

In one embodiment the central coil produces or receives magnetic flux in the direction of the axis, and a further coil is provided to produce or receive flux in a direction orthogonal to the axis.

In another aspect there is provided an inductive power transfer apparatus suitable for producing or receiving a magnetic field for inductive power transfer, the apparatus comprising:
- a central coil having first and second ends and an axis therebetween,
- four end coils,
- two end coils being provided at or adjacent to each end of the central coil, and one of each of the coils at each end of the central coil being on one side of the axis of the central coil and the other being on the other side of the axis,
- the end coils being operable when energised to weaken or cancel flux on one side of the axis and guide magnetic flux through the central coil to provide an arch shaped flux pattern beyond the apparatus on the other side of the axis for inductive power transfer.

In one embodiment the central coil produces or receives magnetic flux in the direction of the axis, and a further coil is provided to produce or receive flux in a direction orthogonal to the axis.

In another aspect there is provided an inductive power transfer apparatus suitable for producing or receiving a magnetic field for inductive power transfer, the apparatus comprising:

a central coil having first and second ends and an axis therebetween, two end coils, one end coil being provided at or adjacent to each end of the central coil, means to operate the coils in a first configuration to weaken or cancel flux on a first side of the axis and provide flux beyond the apparatus on a second opposite side of the axis for inductive power transfer, and to operate the coils in a second configuration to weaken or cancel flux on the second side and provide flux for inductive power transfer on the first side.

Preferably the apparatus comprises an intermediate coupler.

In one embodiment the apparatus comprises energy storage means to store energy received from a field on one side of the apparatus, and switch means adapted to operate the coils in the first and second configurations to store energy received from a field one side of the apparatus and transfer energy from the storage means to provide a field on the other side of the apparatus.

In one embodiment the central coil produces or receives magnetic flux in the direction of the axis, and a further coil is provided to produce or receive flux in a direction orthogonal to the axis.

In another aspect the invention provides a method for inductive power transfer, the method comprising:

operatively connecting one of more coils in a magnetic flux coupling apparatus in a first configuration to receive power inductively from a magnetic field present on a first side of the apparatus, and;

operatively connecting one of more coils in the apparatus in a second configuration to produce a magnetic field on a second side of the apparatus opposite to the first side.

In yet another aspect the invention broadly provides an inductive power transfer apparatus suitable for producing or receiving a magnetic field for inductive power transfer, the apparatus comprising:

a central coil having an axis with first and second ends, two end coils, one end coil being provided at or adjacent to each end of the axis, the central coil and end coils being arranged such that when energised with a power source magnetic flux is present in the central coil along the axis and is guided to a first side of the apparatus by the end coils, and a further coil operable to produce or receive magnetic flux in a direction orthogonal to the axis.

According to a further aspect the invention broadly provides flux coupling apparatus substantially as herein described with reference to the accompanying drawings.

Further aspects of this invention which should be considered in all its novel aspects will become apparent from the following description given by way of example of a possible embodiment thereof.

Any discussion of the prior art throughout the specification should in no way be considered as an admission that such prior art is widely known or forms part of common general knowledge in the field.

BRIEF DESCRIPTION OF PREFERRED EMBODIMENTS

Figure 1A:
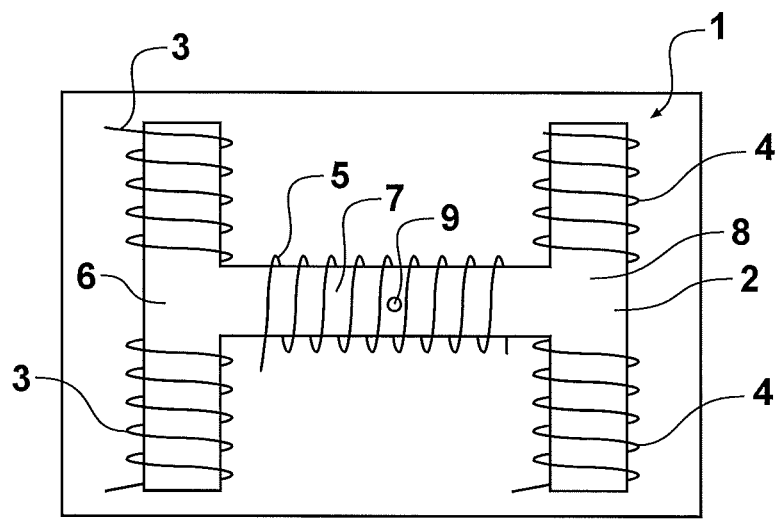
FIG. 1a: shows a schematic side view of an 'H' shaped ferrite with 3 coils.

Referring first to FIG. 1a, a magnetic flux coupling device referred to herein as a pad 1 is shown in side view. As will be described in more detail further below, the pad 1 is adapted to guide or channel magnetic flux so that the pad provides a required magnetic field or flux pattern. One application of the apparatus described is for use in an inductive power transfer system.

In many IPT applications it is preferable to use a pad that is more extensive in two dimensions (for instance horizontally) than it is in a third dimension (height or depth). However, the term "pad" is used in this document to refer to any magnetic flux coupling (i.e. flux generating or receiving) structure, and is not limited to purely pad-like structures.

Referring to FIG. 1a, an H-shaped member 2 made of magnetically permeable material such as ferrite has three coils 3, 4, 5 which are magnetically associated with the member 2. The member 2 may be a unitary structure or may be made from separate pieces or sections. As will be described further below, the structure may take other forms, for example being substantially flat, and in some embodiments the structure may not be present.

The coils 3, 4, 5 may be separated into further part coils (for example to provide increased control of magnetic flux, or to avoid winding around a connection point), and/or may be electrically linked together.

In the example shown in FIG. 1a, the coils are spirally wound or coiled about the magnetically permeable member 2. However, the coils 3, 4, 5 may take other forms. In one embodiment, all or some of the coils 3, 4, 5 may be flat coils. Furthermore, some or all of the coils 3, 4, 5 may be provided on or near the surface of member 2, or may be recessed into or embedded in member 2.

FIG. 1a shows the member 2 having three portions or sections comprising end sections 6 and 8 either side of a central section 7. The sections 6, 7, 8 may comprise separate sections of the member 2, or may comprise portions of a unitary construction. FIG. 1a shows a central section 7 with an associated winding 5. At a first end of the central section 7 a first end section 6 is provided having an associated winding 3. At a second end of the central section 7 a second end section 8 is provided with an associated coil 4. The end sections 6, 8 are preferably substantially orthogonal to the horizontal section 7, and substantially parallel with each other, although variation is possible. In some embodiments, variation of one or both of a) the structure of member 2 and b) the form, position or number of turns of one or more of the coils 3, 4, 5 may be desirable to produce a required magnetic flux pattern.

In the embodiment shown in FIGS. 1a and 1b, the end sections 6, 8 are shown extending above and below the central section 7. Ideally, in order to produce a completely balanced magnetic arrangement (as will be described further below) the central section 7 intersects the end sections 6, 8 at substantially their mid-point. Variation in the shape of the end sections may require movement of the horizontal section 7 away from the mid-point. However, as mentioned above, variations may be used to provide a required magnetic flux pattern in use.

In the following description it is be helpful to refer to a reference magnetic potential 9. For ease of description this has been arbitrarily defined at the centre of the H member 2.

Figure 1B:
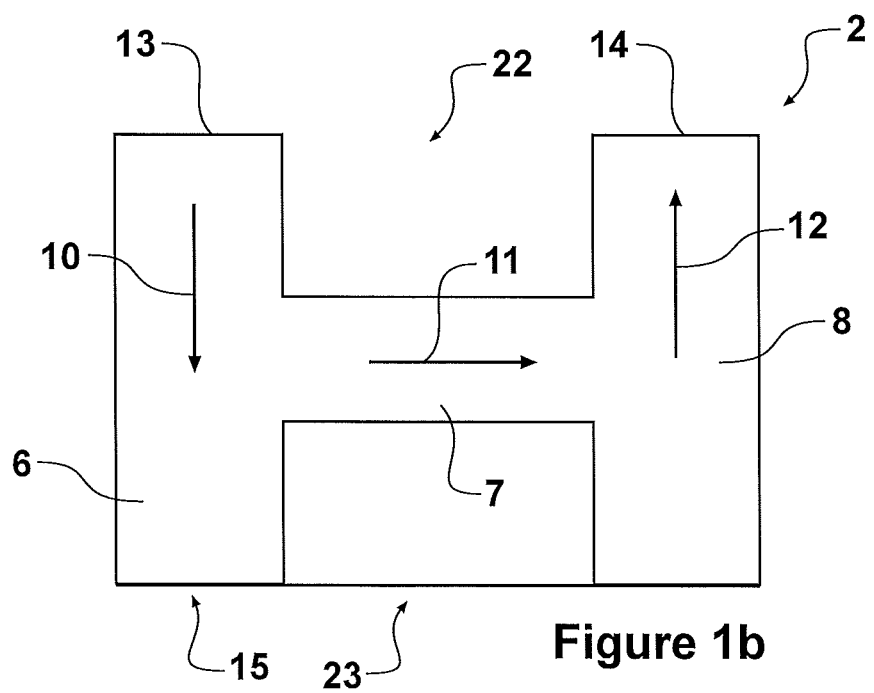
FIG. 1b: shows a schematic of ferrite of FIG. 1a with example magnetomotive force (MMF) indicated by arrows.

Referring now to FIG. 1b the magnetically permeable member 2 is shown without coils 3, 4, 5. Instead, arrows 10, 11, 12 are shown which are representative of the magneto-motive forces (MMFs) generated in use by energisation of the coils 3, 4, 5 respectively. The MMFs 10, 11, 12 are introduced through the application of an electrical power source to the coils of FIG. 1a. The MMFs may be varied by adjusting the phase or magnitude of the electrical power or the number of turns of conductive material in each coil or winding.

In the embodiment shown in FIG. 1b, the MMFs 10, 12 introduced in the end sections 6, 8 are in opposite directions. The MMF 11 in the central section is directed so as to link the two MMFs 10, 12 so they are augmented at the desired side 13, 14 of the pad 1 or member 2. If the MMF 11 of the first section was reversed the field on the obverse (being the opposite or substantially otherwise facing) side 15, 16 would be augmented. The sides of the pad may comprise one, or as shown in FIG. 1b, a plurality of faces. FIG. 1b shows a first side 22 where faces 13 and 14 are relevant for the transmittance of the magnetic field and a second side 23 where faces 15 and 16 are relevant.

Figure 1C:
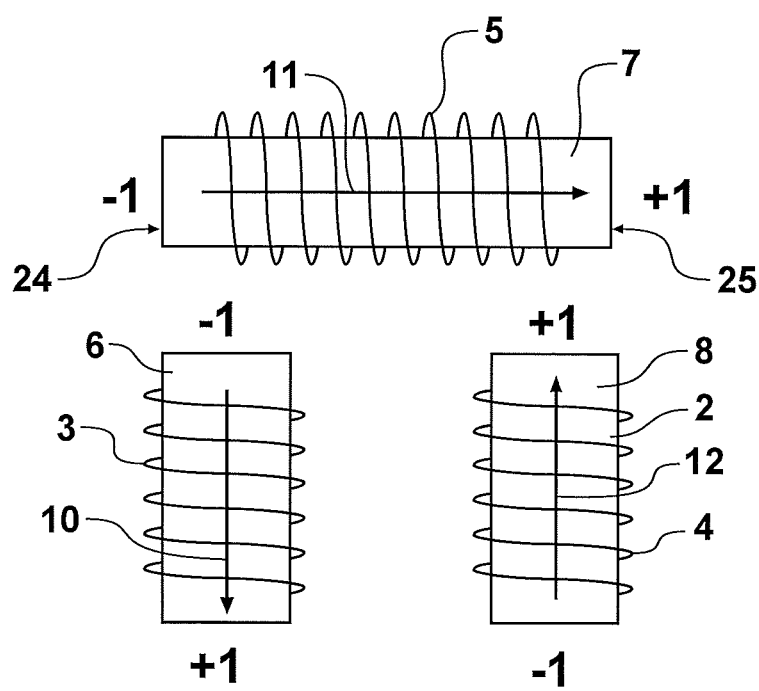
FIG. 1c: shows schematics of portions of the ferrite of FIG. 1a separately with windings, magnetic potentials and MMF directions.

Referring now to FIG. 1c the sections 6, 7, 8 of the member 2 are shown separately with the associated coils 3, 4, 5 and generated MMFs 10, 11, 12. The positive and negative numbers indicate an arbitrary magnitude of magnetic potential in each section. For example the coil 5 drives the ends of the magnetically permeable material section 7 so that a first end has a potential of +1 and a second end has a potential of −1 as shown in FIG. 1c. It will be appreciated that even if section 7 was not present, the result of a given magnetic potential will still be achieved when the coil 5 is energised. This process is similar for each of the other sections. In some embodiments multiple coils may be used in place of one or more of the single coils 3, 4, 5 to create the desired MMF. There is no net potential shift in this design as each coil has a balanced overall potential (e.g. (+1)+(−1)=0). This balance may be achieved by the coils 3, 4, 5 having balanced MMFs. Each of the coils may have the same number of turns with the same current applied (F=NI). In some embodiments the end coils 3 and 4 can be split into two coils, for instance to make the winding easier, or to allow greater control over energisation. This requires an increased number of terminals, for example terminals for completely separate coils, or taps at a location on the coil. In this case the total MMF may be balanced by summing up the separate coil MMFs.

Figure 1D:
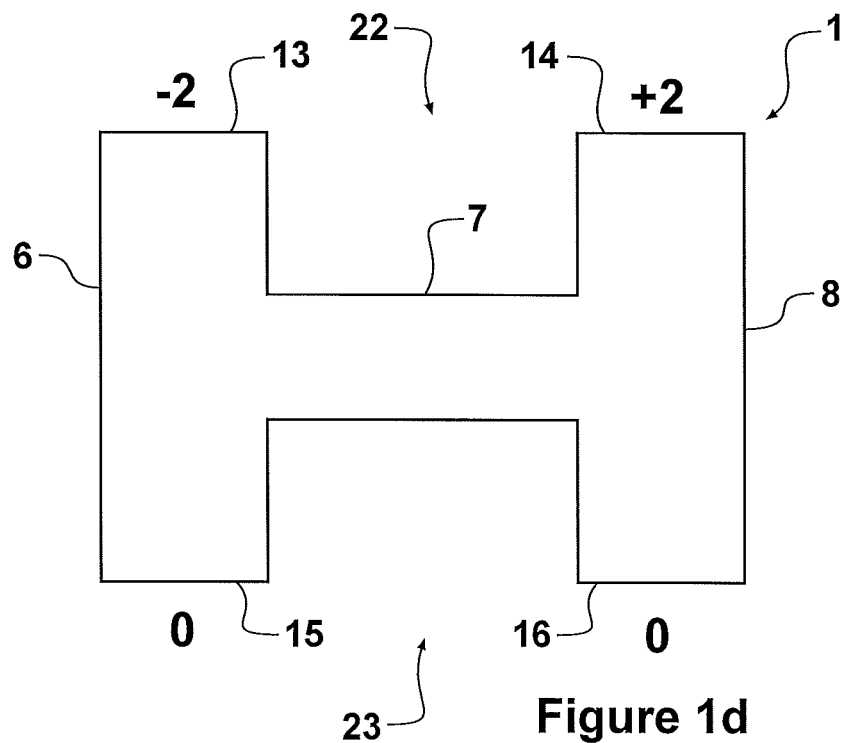
FIG. 1d: shows a schematic of the ferrite of FIG. 1a with example magnetic potentials based on the magnetic potentials and MMF directions of FIG. 1c.

Referring now to FIG. 1d the member 2 is shown with the magnetic potential shown in an ideal environment. The superposition of the interfering fields has created a first side 22 having substantially the maximum and minimum magnetic potential and a second side 23 having substantially zero magnetic potential. In a non-ideal environment the superposition may result in a substantially augmented field at a first side 22 comprising faces 13, 14 and a substantially weakened field at a second side 23 comprising faces 15, 16. A consequence of these magnetic potentials is that magnetic flux will flow between faces 13 and 14 and limited or substantially zero flux will flow from or to faces 15 and 16. Therefore the magnetic flux produced by the pad 1 will substantially be on one side of the pad and will be directed in a direction away from the pad. This flux will extend from the pad structure and be able to couple with a magnetic flux receiving device, including a further pad of this kind or another pad type. The weakened field may reduce or remove the need for a shielding element as used in prior art pads.

The H-shaped member may be viewed as having two vertical coils at the ends of a horizontal coil. These vertical coils are double ended to make them function more effectively. As shown in FIG. 1d for example, a pad in this orientation may be used in a roadway to provide a field extending above the roadway to charge a stationary or moving electric vehicle.

Figure 2:
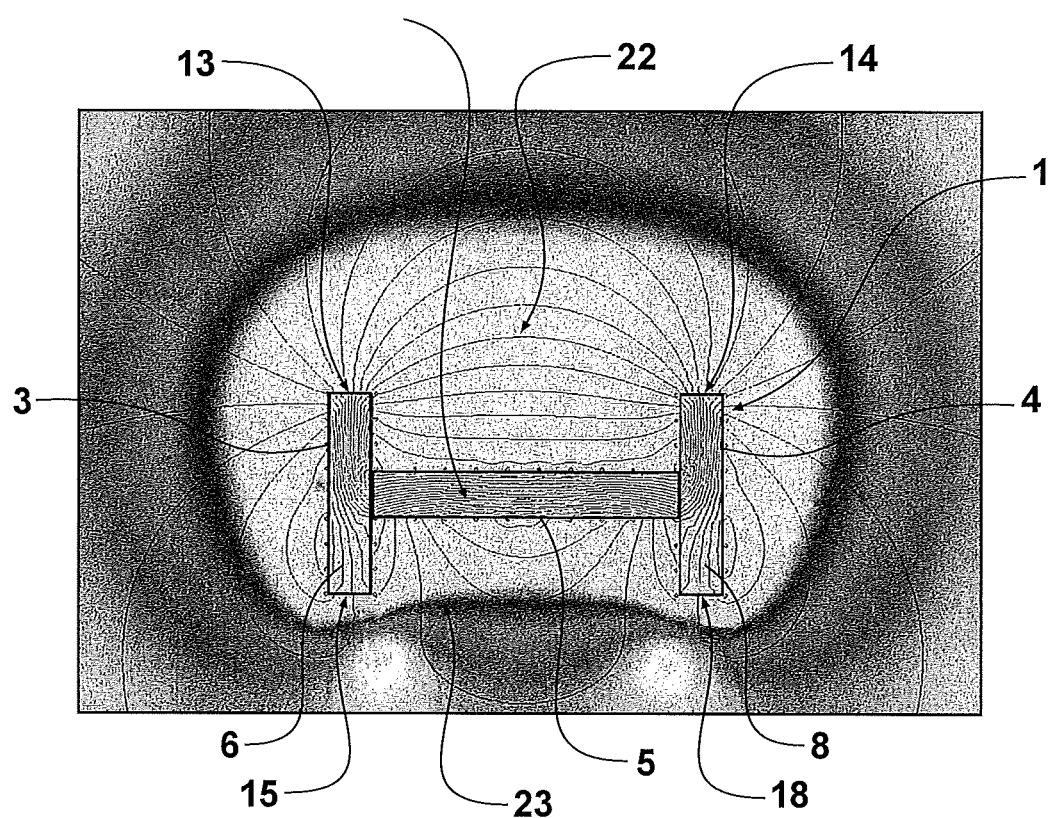
FIG. 2: is a 2D simulation of the flux pattern and magnetic field strength for an embodiment of the invention.

Referring now to FIG. 2 a 2-D simulation of an embodiment of the invention demonstrates the augmented field on a first side 22 of the pad 1 and a weakened field on a second side 23. The non-ideal simulation means that a zero field is not achieved at the faces 15, 16 of the second side but nulls are shown slightly below and inside these faces in FIG. 2. Importantly the region around these nulls also has reduced field strength. The magnetic flux above the pad forms an arch which creates a high flux region extending into the space above the pad 2 where a second, receiving, pad could be located. The pad has produced a high arching flux extending from first side 22 and a substantially reduced or weakened flux on the second side 23. This occurs even though the windings or coils are present on both sides of the magnetically permeable member 2.

Figure 3:
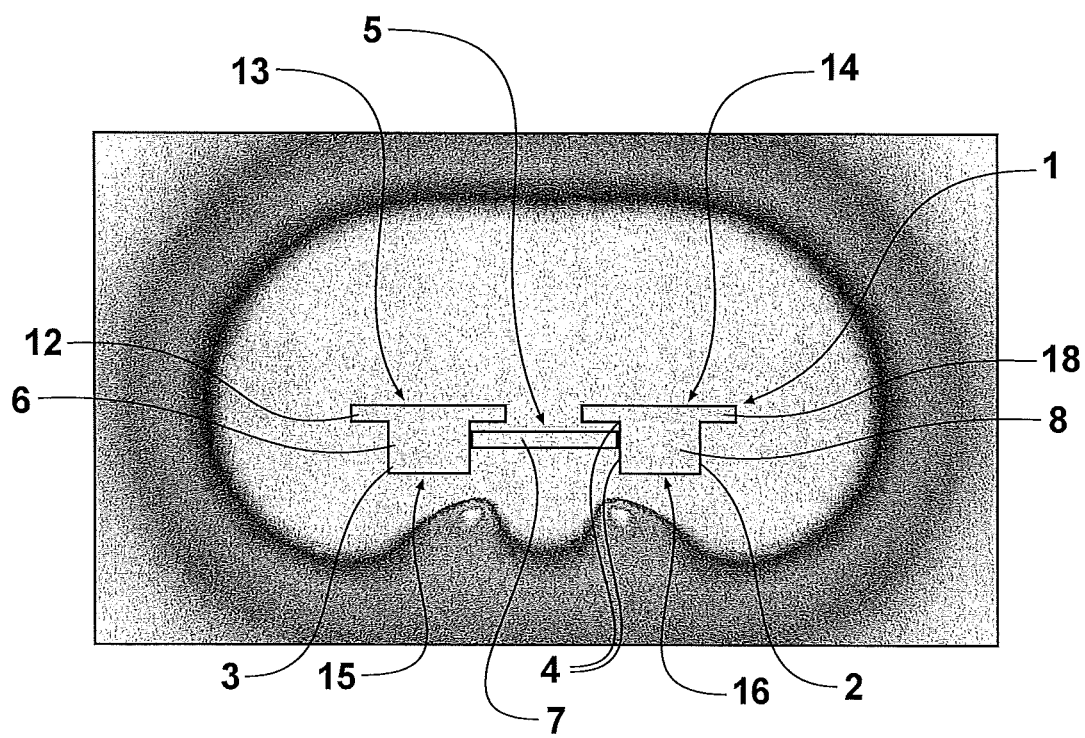
FIG. 3: is a 2D simulation of the magnetic field strength for an embodiment of the invention.

Referring now to FIG. 3 a 2-D simulation is shown having an alternative member 2 shape. In this case the member 2 has enlarged portions on one side. Preferably these are located on the augmented field side of the member 2 in use. The enlarged faces 13 and 14 encourage flux paths to arch out of the surface away from the member. They also reduce the reluctance of any flux paths very close to the member (i.e. those passing near the horizontal member. Similarly to FIG. 2, nulls are present near one of the sides of the pad 1 and an extended field is seen at the opposite side of the pad. In some cases the sides of the pad may not be directly opposite or a geometrical variation may be present. As described previously the coils 3, 4 on the second and third members 6, 8 are shown in two portions or parts. The separation occurs about the first member 7.

Figure 4:
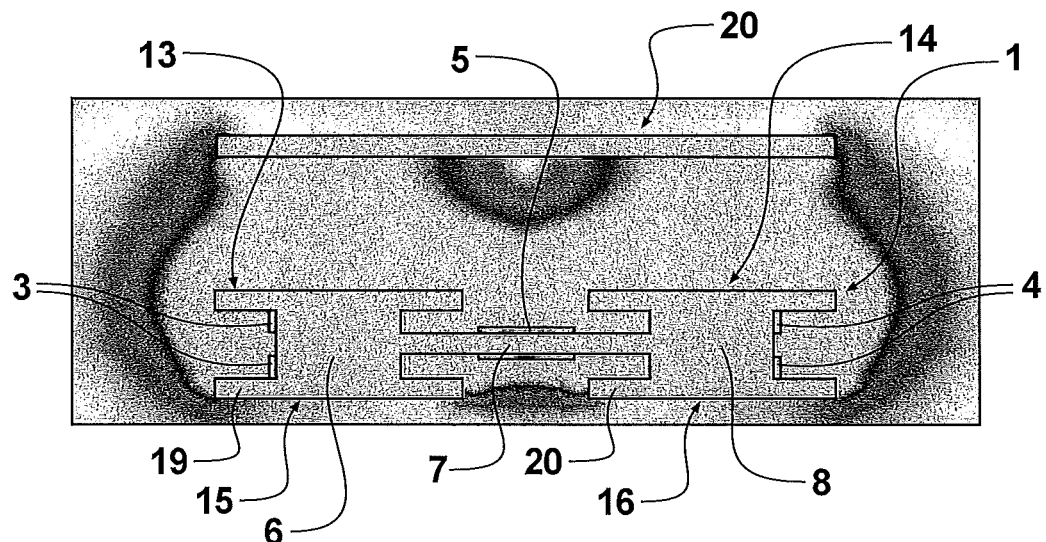
FIG. 4: is a 2D simulation of the magnetic field strength for an embodiment of the invention including a flux collector above the pad.

Referring now to FIG. 4 a further alternative member 2 is shown having enlarged faces on the first and second side. The shape of the member 2 may be further optimised by adjusting the member shape. The brittleness of the material used, such as ferrite, may limit the available shape options. Also shown in FIG. 4 is a magnetically permeable collector 21. The collector may for example represent a second pad such as that described with reference to the earlier drawing Figures, or one described in the earlier publications referred to in this document.

In the simulation shown in FIG. 4 the collector 21 is represented as a simple ferrite bar. The presence of the ferrite bar or collector 21 creates an improved field structure. The field is now amplified or augmented more strongly on the first side and the nulls on the second side appear deeper. This suggests that the new pad described herein, when a preferable path is provided like that of the collector 2, provides a magnetic flux which is strengthened in that path while providing a reduced flux in other, less preferable paths. The result is that the pad is particularly efficient and has low leakage when in use or transferring power to a pad. This is beneficial because the most important time to limit leakage flux is when the pad is in use. A pad may be turned off when not in use to limit leakage flux.

It can be seen that the end coils act to channel or guide magnetic flux through an angle (in these examples 90 degrees), so that the flux from the coils together loops substantially from only one side of the apparatus, forming an desirable arch shaped flux pattern extending from that side which may be used for inductive power transfer.

Figure 5:
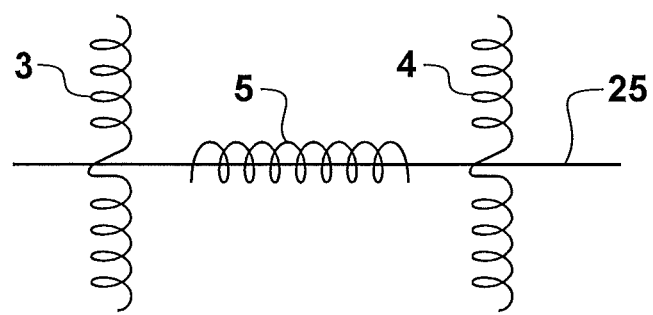
FIG. 5: is a schematic side view of an embodiment of the invention without a highly permeable magnetic sub-structure.

Referring now to FIG. 5, an embodiment is shown which does not include permeable member 2. In this embodiment an axis 25 through the central coil 5 is illustrated, and it will be seen that the end coils 3, 4 have one or more turns either side of the axis, as with the other embodiments described above. It will be seen that other embodiments may include varying amounts of permeable material which may for example be distributed in the vicinity of the coils to provide required magnetic performance.

Figure 6:
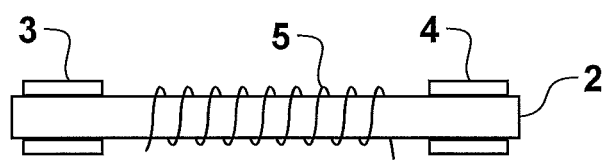
FIG. 6: is a schematic side view of an embodiment of the invention with flat end coils.

Turning to FIG. 6, an embodiment is shown in which coils 3 and 4 are provided as flat coils. This arrangement has the advantage of a low profile.

Figure 7:
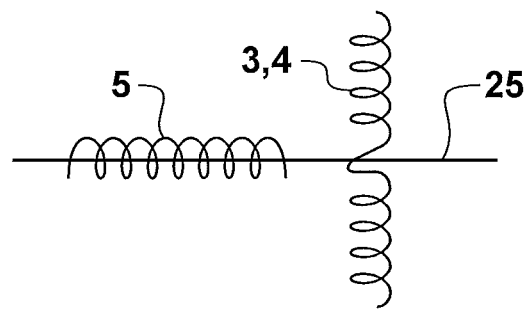
FIG. 7: is a schematic side view of an embodiment of the invention with ends coils at only one end of the central coil.

In FIG. 7, another embodiment is shown in which one end coil is provided, having one or more turns on either side of axis 25. Again, the end coil may be split into two individually controllable coils. The arrangement shown in this Figure may be used to provide a required flux pattern.

Those skilled in the art will appreciate that the apparatus described herein may produce or receive a magnetic field on one side or the other, dependent on the manner in which the coils are energised. In practice switch means may be used to connect the coils in a first configuration so as to be operable to receive or produce energy from a magnetic field on one side of the apparatus, and a second configuration for receiving or producing energy from a magnetic field on the other side. Thus the apparatus may be used as an intermediate magnetic coupler. The coils may be operable to receive energy from a magnetic field on a first side, and then operatively re-configured using switching means to provide a field on the second side. The field on the second side is provided from energy received from the field present on the first side.

In one embodiment an energy storage element such as a capacitor is used to store energy received from a time varying field magnetic field on a first side of the apparatus. The energy stored in the energy storage element may be received over one or more cycles of the time varying field. At an appropriate time the storage element can be connected to the coils so that a field is provided on the other side of the apparatus, to be received by another flux coupler, so that power is transferred.

An intermediate coupling arrangement such as that described above has advantages that the distance over which power transfer occurs can be extended, and that the flow or amount of power being transferred can be controlled.

Figure 8:
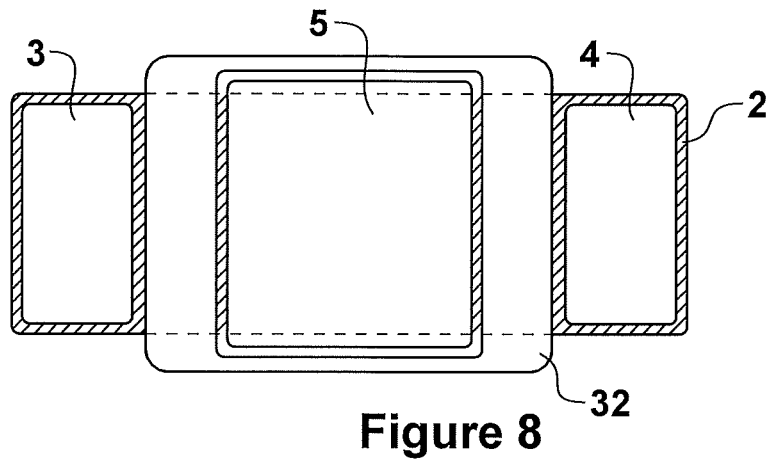
FIG. 8: is a plan view of an embodiment of the invention including a further coil (referred to herein as a "Q" coil) adapted to capture or produce flux in a direction orthogonal to the central coil.
Figure 9:
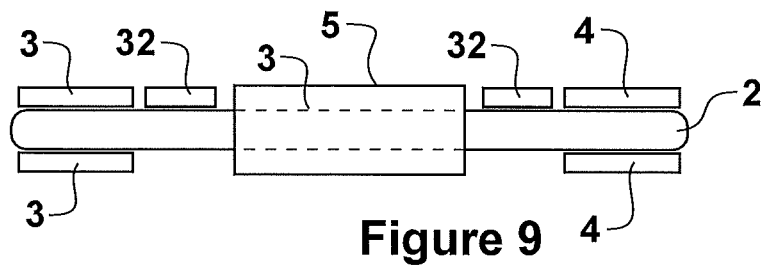
FIG. 9: is a side elevation of the apparatus shown in FIG. 8.

Turning now to FIGS. 8 and 9, another embodiment is illustrated diagrammatically, wherein like reference numerals designate like features of other embodiments described above. The member 2 is shown as a solid block of material for ease of illustration, and is shaded in the plan view of FIG. 8 to enable it to be seen relative to the coils or windings. Although a unitary piece of material is shown, other shapes and arrangements are possible. In some embodiments the member 2 may have a primary purpose of providing structural support. In other embodiments member 2 may primarily act as a magnetic member for concentrating magnetic flux. Also, the shape of the member 2, whether provided as a single piece of material, or separate pieces of material, may vary depending on factors such as: required flux density; magnetic saturation; the shape of the fields produced or received; physical spatial limitations. One example is illustrated diagrammatically in FIG. 14 in which two separate possible structures for the member 2 are shown: on the left hand side as a solid piece of material; and on the right hand side as a number of bars 30 of a suitable material, for example ferrite. Structures using bars are described for example in patent publications WO2010/090539 and WO2011/016737.

Referring again to FIGS. 8 and 9, the end coils 3, 4 and the central coil 5, are shown in outline rather than showing individual turns of conductive material, for purposes of clarity of illustration. It will be seen that the structure is similar to that described with reference to FIG. 6, but the primary difference being the presence of a further coil 32. For convenience coil 32 is referred to in this document as a "Q" coil. As described above, in use the flux in the central coil 5 is present along axis 25 (refer FIG. 5), and is guided in/out one side of the apparatus by the end coils 3, 4. Thus the arrangement is not adapted to receive or produce flux (or a flux component) in a direction orthogonal to the axis 25 in the middle of the structure i.e. in the middle of coil 5. In use, coil 32 allows such an orthogonal flux component to be produced or received. Operation of a Q coil 32 is described in the patent publications referred to in the preceding paragraph. Q coil 32 is provided on the side of the apparatus from or to which flux is received or produced in use.

Figure 10:
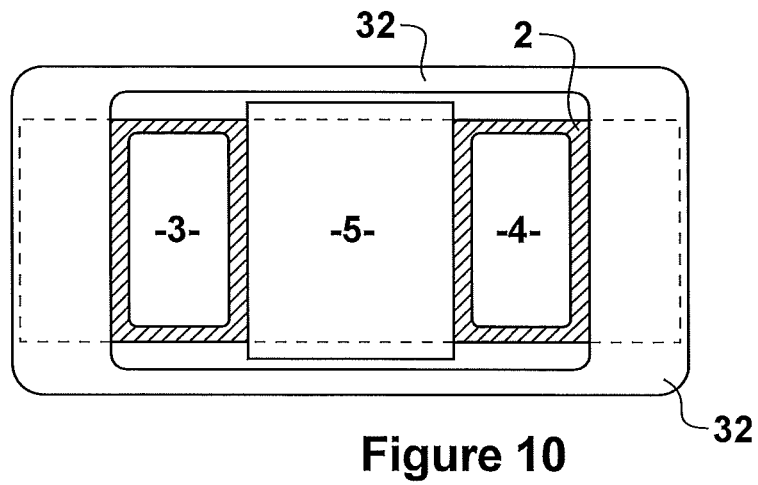
FIG. 10: is a plan view of another embodiment of the invention including a Q coil.
Figure 11:
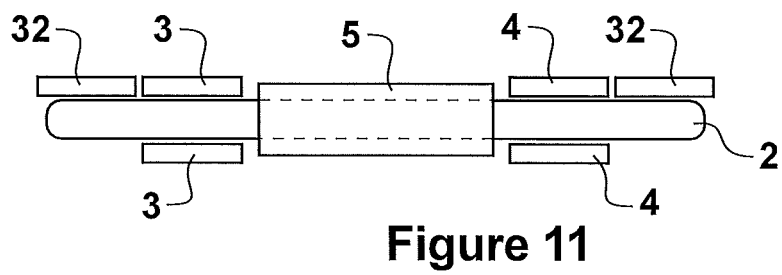
FIG. 11: is a side elevation of the apparatus shown in FIG. 10.

Another embodiment is shown in FIGS. 10 and 11 in which the Q coil 32 is provided externally (I.e. around the periphery of) coils 3, 4, 5. Again, the Q coil 32 is provided on the side of the apparatus from or to which flux is received or produced in use.

Figure 15:
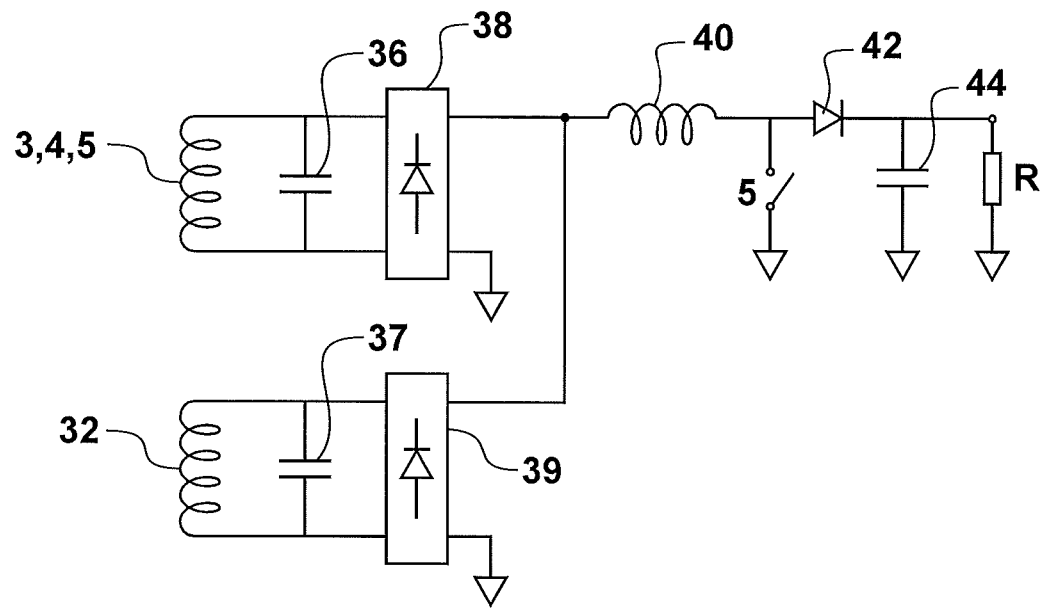
FIG. 15: is a circuit schematic of one possible arrangement for receiving power from the coil arrangements described with reference to FIGS. 8-11.

FIG. 15 shows a circuit schematic illustrating one example of the use of the Q coil embodiments described with reference to FIGS. 8-11 to receive power inductively from a time varying magnetic field. Coils 3, 4, 5 are shown wound as a single winding. The coils 3, 4, 5 are tuned by tuning capacitor 36 to provide a resonant circuit, and the output is rectified by diode bridge 38 before being provided to a control circuit comprising a DC inductor 40 and a switch S. The flow of power to DC filter capacitor 44 (and thus to load R) via diode 42 is controlled by operating switch S. Leaving the switch S open allows power to flow to the load R, closing the switch prevents power flow. Operation of switch S may be fast or slow relative to the frequency of the current in the tuned circuit. Further disclosure of the operation of a control circuit such as that described above may be found in U.S. Pat. No. 5,293,308.

The Q coil 32 is tuned to resonance by tuning capacitor 37 and the output is rectified by diode bridge 39 for provision to the control circuit described above.

Figure 12:
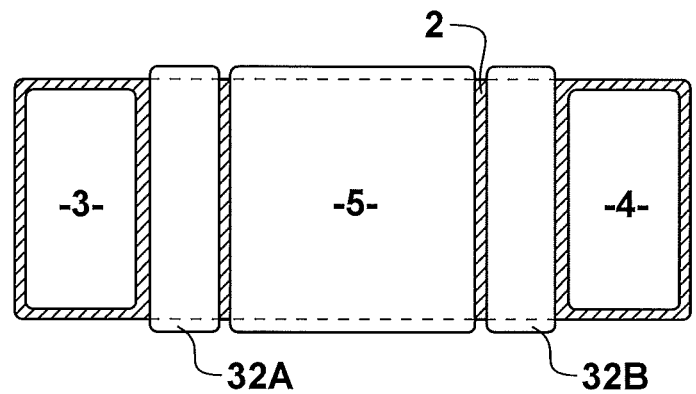
FIG. 12: is a plan view of another embodiment of the invention including a Q coil in which the Q coil is wound as two separate part-coils.
Figure 13:
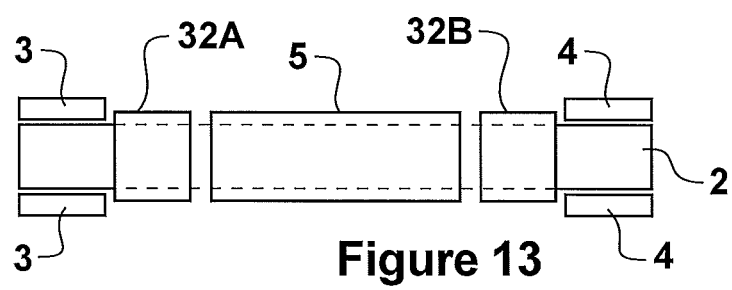
FIG. 13: is a side elevation of the apparatus shown in FIG. 12.

In FIGS. 12 and 13, a further embodiment is shown in the Q coil comprises two part-coils 32A and 32B. These windings are connected out of phase, as will be described further below. For example, when the apparatus used as a receiver, a flux component having a vertical direction (as shown in FIG. 13) and centrally of coil 5, may separate i.e. branch and travel in opposite directions through member 2. The separate fluxes produce a voltage in each part-coil 32A and 32B. One example of a circuit for receiving and controlling power using the apparatus of FIGS. 12 and 13 is shown in FIG. 16.

Figure 16:
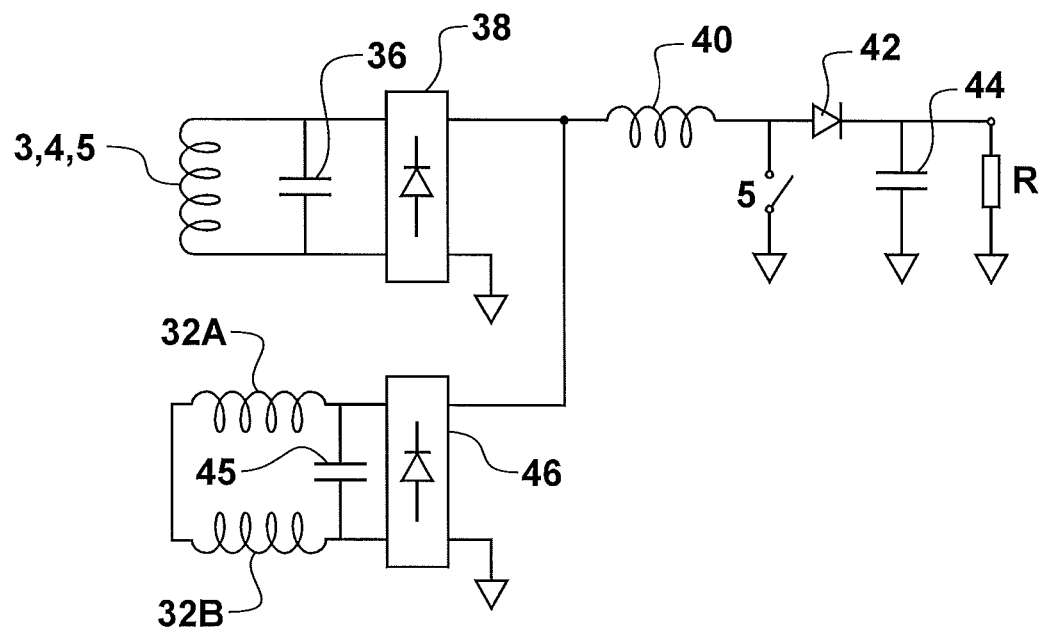
FIG. 16: is a circuit schematic of one possible arrangement for receiving power from the coil arrangement described with reference to FIGS. 12 and 13.

FIG. 16 shows a circuit schematic illustrating one example of the use of the Q coil embodiments described with reference to FIGS. 12 and 13 to receive power inductively from a time varying magnetic field. The circuit is similar to that described with reference to FIG. 15, and like features have like reference numerals. Again, Coils 3, 4, 5 are shown wound as a single winding. The two part-coils 32A and 32B are connected out of phase, so that their outputs are summed. The part-coils are tuned with a tuning capacitor 45, and the output of the resonant circuit is rectified using diode bridge 46. The remainder of the circuit operation is as described with reference to FIG. 15.

Figure 14:
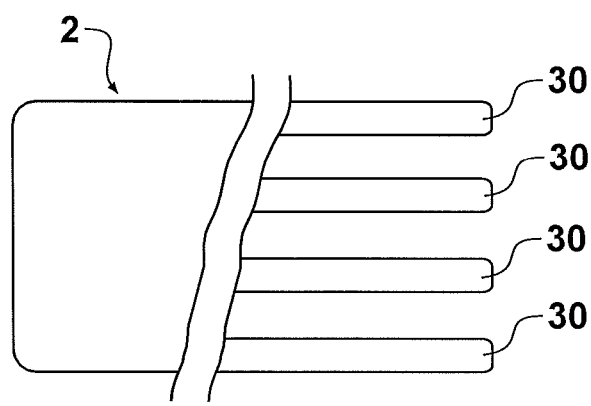
FIG. 14: is a plan view illustrating two different arrangements of ferrite of similarly highly magnetically permeable material that may be used with the various embodiments of the flux coupling apparatus described herein.
Figure 18:
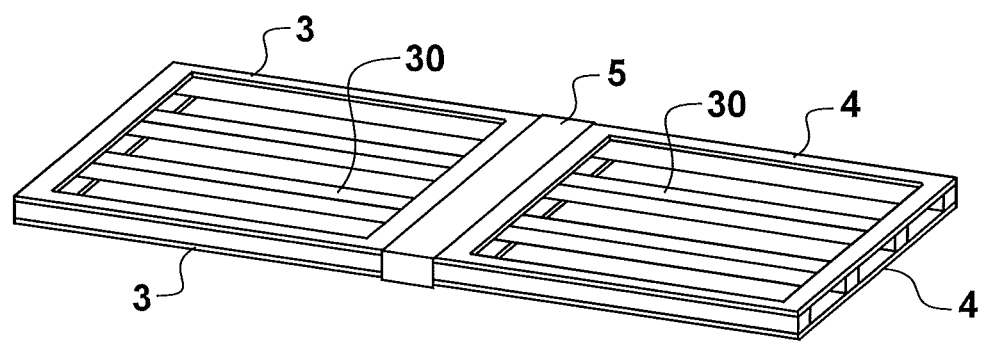
FIG. 18: is an isometric view of a further embodiment of a flux coupling structure.

Referring now to FIG. 18, a practical embodiment of a pad structure is shown which has some features similar to the embodiment shown in FIG. 6, and uses a magnetically permeable base structure that is similar to that shown in FIG. 14. In the FIG. 18 embodiment the end coils 3 and 4 which guide flux into and out of the structure are formed from two separated flat coils which are wound together so as to form a "solenoidal" type winding which is separated by ferrite bars 30. The end coils 3 and 4 are separated by a solenoidal coil 5 which may effectively link the bar structures 30. Although ferrite is a preferred form of material, other highly permeable magnetic materials may be used, and the material may be formed as a unitary item, rather than in the form of separate individual bars. In practice, we have found that bars 30 are highly practical since they are readily formed from commercially available ferrite structures, and despite being spaced apart, still provide a sufficiently permeable region to guide flux through the pad structure. Moreover, alignment of the bars in the longitudinal direction in which flux is intended to propagate through the pad structure provides a low reluctance path in the required direction.

Figure 17:
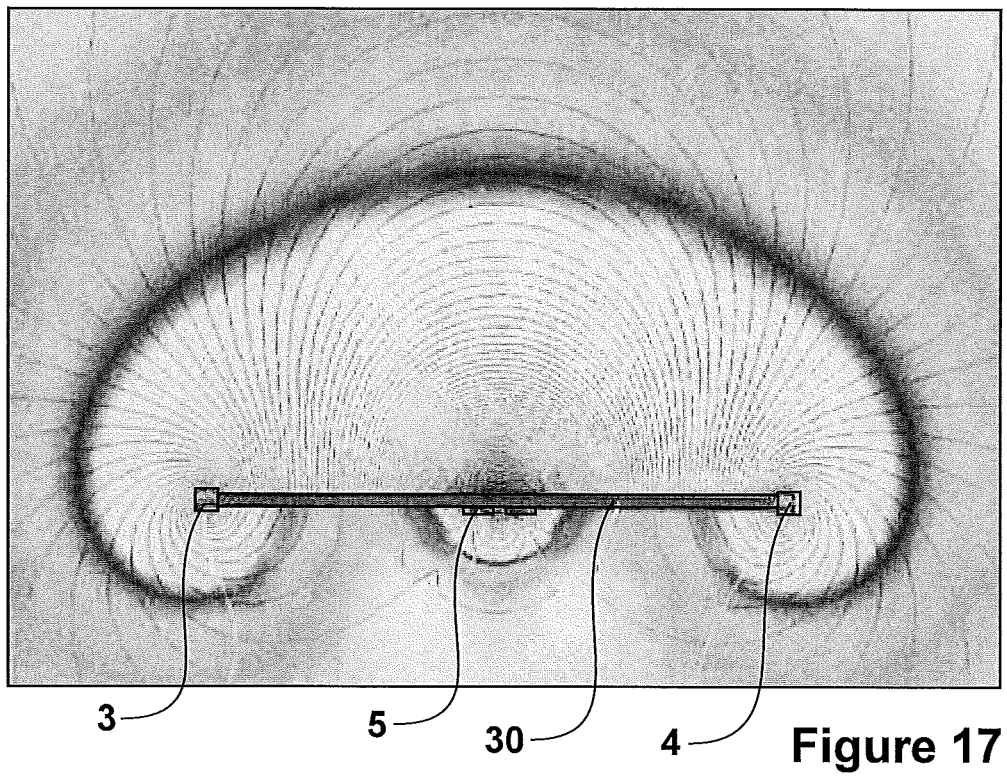
FIG. 17: is a 2D simulation of the magnetic field strength for an embodiment of the invention generally similar to that shown in FIG. 18.

Turning to FIG. 17, a flux pattern is shown in a cross section in a vertical plane through the middle of the pad structure is shown in FIG. 18. The structure of the coils 3, 4 and 5 are visible in the cross section, together with bars 30 and shows the highly controlled field at the back of the pad structure (i.e. in the lower part of FIG. 17 beneath the ferrite bars 30).

It will be seen that the invention provides a highly efficient flux coupler which can provide an essentially single sided magnetic flux, but which may also be used to provide a variety of different field shapes.

The invention claimed is:

1. An inductive power transfer apparatus suitable for producing or receiving a magnetic field for inductive power transfer, the apparatus comprising:
    a central coil having first and second ends and an axis therebetween; and
    two end coils, one end coil being provided at or adjacent to each end of the central coil, each of the end coils being arranged to provide a first winding and a second winding,
    wherein the first windings are provided on one side of the axis of the central coil, and the second windings are provided on the other side of the axis of the central coil, and
    wherein the apparatus comprises a magnetically permeable structure which is located along the axis.

2. The apparatus as claimed in claim 1 wherein the end coils are each arranged at an angle relative to the central coil such that when energized the end coils guide magnetic flux through the central coil to provide an arch shaped flux pattern beyond the apparatus for inductive power transfer.

3. The apparatus as claimed in claim 1 wherein the end coils are arranged relative to the central coil such that when energized with a power source magnetic fields produced by each coil augment each other on a first side of the apparatus and substantially weaken each other on a second side of the apparatus opposite to the first side.

4. The apparatus as claimed in claim 1 wherein the first windings are provided on one side of the permeable structure and the second windings are provided on another side of the permeable structure.

5. The apparatus as claimed in claim 1 comprising a further coil adapted to produce or receive a magnetic flux component in a direction substantially orthogonal to the direction of a magnetic flux component produced or received by the central coil.

6. The apparatus as claimed in claim 1 wherein the first and second windings comprise flat windings.

7. An inductive power transfer apparatus suitable for producing or receiving a magnetic field for inductive power transfer, the apparatus comprising:
    a central coil having first and second ends and an axis therebetween;
    two end coils, each of the end coils being arranged to provide a first winding and a second winding, the first and second windings comprising flat windings;
    one end coil being provided at or adjacent to each end of the central coil, and one or more turns of each of the end coils being on one side of the axis of the central coil and the remaining turns being on the other side of the axis; and
    the end coils being arranged at an angle relative to the central coil and operable when energized to weaken or cancel flux on one side of the axis and guide magnetic flux through the central coil to provide an arch shaped flux pattern beyond the apparatus on the other side of the axis for inductive power transfer, wherein the apparatus comprises a magnetically permeable structure which is located along the axis.

8. The apparatus as claimed in claim 7 wherein a further coil is provided at a side of the apparatus where flux is produced in use, a center axis of a winding of the further coil being arranged in a direction orthogonal to the axis of the central coil.

9. The apparatus as claimed in claim 7 wherein the one or more turns of each end coil are provided on one side of the permeable structure and the remaining turns are provided on another side of the permeable structure.

* * * * *